United States Patent Office 3,773,723
Patented Nov. 20, 1973

3,773,723
THERMOSETTING RESINS COLOR STABILIZED WITH DIALKYL THIODIPROPIONATES
Harold F. Cole, Racine, Wis., assignor to The Dexter Corporation, Windsor Locks, Conn.
No Drawing. Filed Nov. 24, 1971, Ser. No. 201,972
Int. Cl. C08f 45/58
U.S. Cl. 260—45.85 S
9 Claims

ABSTRACT OF THE DISCLOSURE

Selected thermosetting resins are stabilized against discoloration by the addition of effective amounts of dialkyl thiodipropionates.

---

The present invention relates to new thermosetting resin compositions which are stabilized against discoloration. More specifically, the present invention relates to thermosetting resin compositions which are stabilized against color formation during curing by the use of dialkyl thiodipropionates. In addition to being stabilized against color development, the present invention provides thermosetting coating compositions which exhibit superior adhesion properties, and particularly superior adhesion to plastisol materials.

The prior art has described the use of the diesters of thiodipropionic acid, usually combined with other materials, to stabilize thermoplastic polyalpha-olefins such as polyethylene resins and polypropylene resins. The prior art has been limited to teaching the use of these diesters as stabilizers for thermoplastic resins and there is no teaching, known to applicant, in the prior art which suggests these diesters are useful for thermosetting resins which are cured via a chemical reaction. Since thermoplastic resins are not intended to chemically react during their fabrication or use, a stabilizer which will stop or interfere with any and all chemical reactions would be suitable to stabilize thermoplastic resins. Such a stabilizer would react with any unintended impurities or any resin decomposition products which tend to discolor the thermoplastic resin. Since thermosetting resins, by definition, require a chemical reaction in order to cure, such wide range stabilizers (which would stop or interfere with any and all chemical reactions) would not be suitable since they would tend to stop or interfere with the reaction by which the thermosetting resin is cured. Based on these observations, those skilled in the art assumed that the presence of the dialkyl esters of thiodipropionic acid in thermosetting resin systems would interfere with the chemical reaction by which the thermosetting resins are cured.

The present invention is based on the discovery that the dialkyl thiodipropionates act as color stabilizers during the curing of thermosetting resins, and in doing so the dialkyl thiodipropionates do not interfere with the curing reactions and do not deteriorate the physical properties of the thermosetting resins, but in some cases the physical properties seem to be improved.

During the curing of thermosetting resins, and particularly the curing of phenolic resins or phenolic-rubber resins, color develops during the baking cycle which is used to cure the resins. Typically the phenolic based compounds develop a deep gold color during the cure cycle, and the color development has been used to determine the state of cure of the phenolic resin. In other words, it had been found that the state of cure of the phenolic was proportional to the amount of color developed.

During the curing of thermosetting resins, color of varying degrees is developed. Although the mechanisms by which the color development occurs is not fully understood, it is believed the color development is a result of decomposition of some of the components of the resin system. This theory is supported, in some measure, by observation that various tensile properties deteriorate as the curing continues beyond a certain point, and the color development likewise continues. The stabilizers of the present invention seem to hinder color formation during the cure cycle, and therefore it is hypothecated that the stabilizers of the present invention may hinder deterioration of other film properties.

Although applicant does not wish to be bound by the theory postulated below, the mechanism described below seems to explain the apparently contradictory results achieved by the stabilizers of the present invention.

It is believed that upon heating the dialkyl thiodipropionates, the sulfur of the dialkyl thiodipropionate changes from the divalent state to the tetravalent. The tetravalent sulfur containing dialkyl thiodipropionates preferentially react with peroxides by extracting an oxygen molecule from the peroxide, thus changing the peroxide to an alcohol. The dialkyl thiodipropionates appear to function as successful stabilizers under the curing conditions usually used for thermosetting resins by preferentially reacting with the peroxides which are formed during the cure and thus avoiding the formation of peroxide decomposition products which are chromophoric.

The formulas given below depict the postulated mechanism by which the dialkyl thiodipropionates prevent the decomposition of the peroxide by converting them to alcohols.

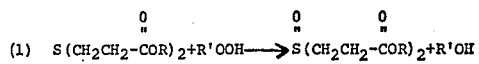

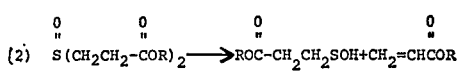

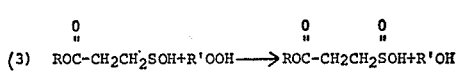

More specifically, in the case of phenolics, it is also postulated that the dialkyl thiodipropionates act as stabilizers by decomposing the peroxides. The mechanism proposed is as follows:

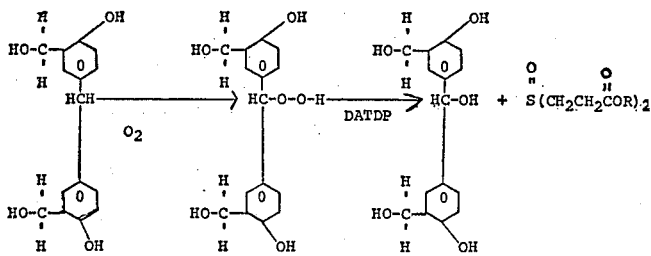

It is possible that a portion of the discoloration of phenolics and similar thermosetting resins is caused by iron contamination. It is postulated that the dialkyl thiodipropionates also stabilize discoloraton caused by iron contamination. The source of iron is apparent, since most of the materials or raw materials are made in steel or other ferrous metal containing vessels. According to the theory postulated, a phenol with a methylol or methaldehyde group in the ortho or para position will readily complex with iron to form a highly chromopohoric group. The sulfur in dialkyl thiodipropionates will complex with the substituted phenolic more readily than will iron. It is postulated that the sulfur-phenolic complex formed is much less chromophoric than a corresponding iron-phenolic complex that would have been formed but for the stabilizing presence of the dialkyl thiodipropionates.

It has been found that by the use of small quantities of dialkyl thiodipropionate in phenolic resins, development of the gold color can be substantially reduced, while at the same time promoting the plastisol adhesion of selected resin systems and maintaining the other film properties of the selected thermosetting resin systems. The present invention has proved to be extremely useful in coating the interior surfaces of closures.

The present invention may be used with a wide variety of thermosetting resins, and combinations of thermosetting resins. For instance, the dialkyl thiodipropionates have shown good utility when used with phenolic resins such as phenol-formaldehydes, bisphenol A-formaldehyde, condensed phenol-formaldehyde, condensed bisphenol A-formaldehyde, rubber-phenolics, epoxy ester phenolics, vinyl phenolics, vinyl-rubber phenolics, and epoxy phenolics, and other resin types such as butadiene-acrylonitrile copolymers, carboxyl terminated butadiene-acrylonitrile copolymers, vinyl chloride-vinyl acetate-maleic acid modified, vinyl chloride-vinyl acetate-vinyl alcohol, certain one package polyurethane resins and other materials which will be apparent to those skilled in the art.

It has been found that the dialkyl thiodipropionates will accomplish at least some stabilization of thermosetting resins, except those thermosetting resins which contain natural drying oils or modified natural drying oils such as linseed alkyds or the like. However, some stabilization of oil containing resins such as short/medium (30%) epoxy esters has been observed, but the stabilization of such oil-containing resins and oil-containing resin systems is not entirely predictable. It is postulated that the dialkyl thiodipropionates function as antioxidants and it seems reasonable to expect that antioxidants would interfere with the curing of oil containing resins which cure by an oxidation reaction. It has been noted that the dialkyl thiodipropionates seem to promote discoloration when used in some oil-containing resin systems.

It has been found that by using from about 0.1 to about 12% by weight of the dialkyl thiodipropionate esters, based on the weight of the thermosetting resin solids, that color stabilization can be achieved. Further, it has been found that with selected resin systems the maximum improvement in plastisol adhesion is achieved when the dialkyl thiodipropionate is present in from about 2.5 to about 7.5% by weight, based on the resin solids. Since the dialkyl thiodipropionate esters are relatively expensive, the upper limit of 12% is basically determined by the economics. Although additional color stabilization can sometimes be achieved by using more than 12% by weight of the dialkyl thiodipropionate, as the percentage of stabilizer approaches the range of 15 to 20%, based on thermoesetting resin solids, the compositions may start to lose film properties and/or become economically unfeasible.

The use of the preferred quantity of dialkyl thiodipropionate, and particularly dilauryl thiodipropionate in addition to stabilizing color, or inhibiting color formation, and improving plastisol adhesion, seems to function as a subtle plasticizer for the coating in that flexibility is sometimes improved. It is believed that the improved flexibility is a result of stopping chain scission caused by peroxide decomposition.

The stabilizers of the present invention may be used either in clear resin compositions or in pigmented systems. Frequently, particularly in the field of liners for sanitary closures, a white coating is desirable, and it is possible to use the stabilizers of the present invention with titanium dioxide pigmented systems to give a clear white color. Other pigments likewise may be used. It is contemplated that the stabilizers of the present invention are valuable in pigmented systems where matching colors from one batch to the next is critical. The freedom from color development in curing the resin system such as color caused by minor variations in the curing cycle, is believed to be a great advantage.

The present invention contemplates the use of diesters of 3,3'-thiodipropionic acid having the following formula:

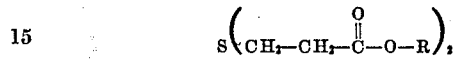

wherein R is an alkyl group having from about 1 to at least about 18 carbon atoms, with 8 to 18 carbon atoms being preferred. A particularly effective ester, as was mentioned above, is the ester with 12 carbon atoms as the R substituent, namely, dilauryl thiodipropionate. Additionally, distearyl thiodipropionate appears to have good stabilization properties, but is generally less soluble than the dilauryl thiodipropionate and is not as compatible with the various thermosetting resin systems. The lack of solubility makes this material difficult to incorporate in the thermosetting resin systems to which this invention is directed. In addition to the difficulties of incorporation, the distearyl thiodipropionate has shown a tendency to bloom or migrate to the surface of the resin during curing.

The stabilizers of the present invention may be incorporated into the resin systems by any convenient method. It has been found that the stabilizers can be dissolved in various aromatics solvent such as toluene or xylene, and added to a resin solution. The stabilizers can usually be added to the resin system simply by adding the stabilizer to the resin while it is in solution. It has been found that best results are achieved when the stabilizer is first dissolved in a solvent and then the resin or resin solution is dissolved or mixed into the stabilizer solution.

The stabilizers of the present invention may be used with resins that are cured over a wide range of conditions. Because of their volatility it is generally desirable to avoid long bakes at very high temperatures, although short bakes at temperatures of 450 or 500° F. can be tolerated.

The following examples will serve to illustrate the preparation of several stabilized thermosetting resin systems, and particularly coating compositions employing stabilized thermosetting resins, but it is understood that these examples are set forth merely for illustrative purposes and many other stabilized thermosetting resin compositions are within the scope of the present invention.

EXAMPLE 1

A white heat-curable can coating was prepared by mixing the materials listed below in a 1 gallon lined can. The mixing was carried out at room temperature using a drill press mixer with a Cowles-type agitator.

| | Grams |
|---|---|
| VMCH (vinyl solution) | 169 |
| EPN 1139 (epoxy novolac plasticizer-stabilizer) | 43 |
| Geon 128F1 (vinyl chloride homopolymer dispersion resin) | 42 |
| Xylol | 127 |
| Isophorone | 127 |
| Methyl isobutyl ketone | 39 |
| Enjay-150 (an aromatic hydrocarbon solvent) | 146 |
| Cyclohexanone | 111 |
| Diacetone alcohol | 111 |
| Titanium dioxide | 187 |
| Total | 1102 |

The VMCH is a white, powdered solid containing a solvent polymerized vinyl chloride-vinyl acetate copolymer with a chemical composition of about 85.0 to 88.0% by weight vinyl chloride, about 11.0 to 14% by weight vinyl acetate, about 0.8 to 1.2% by weight maleic acid and having a specific viscosity of from about 0.536 to 0.567 as measured by 1.0 g. of resin per 100 ml. of solution in methyl isobutyl ketone at 20° C.

The EPN 1139 is a liquid polyglycidyl ether of phenol formaldehyde novolac resin which functions as a stabilizer plasticizer. It has an equivalent weight of 172–179, an epoxy value of 0.56–0.58 eq./100 g. and a viscosity of 1400–2000 cps. at 52° C.

The Geon 128F1 is a high molecular weight vinyl chloride homopolymer dispersion resin made by emulsion polymerization to give an inherent viscosity of 1.2.

These materials were sand ground to give a Hegman grind of 7. The resulting materials contained 23% resin solids of the following breakdown:

| | Percent by weight |
|---|---|
| VMCH | 66.5 |
| Epoxy novolac | 16.9 |
| Vinyl chloride homopolymer | 16.9 |

EXAMPLE 1A

To one hundred grams of the ground material described above was added 50 grams of a solution containing 10% by weight Hycar 1432 (butadiene acrylonitrile copolymer) dissolved in a 70/30% by weight mixture of xylol and isophorone and 12.5 grams of RP–902 phenol formaldehyde resin. This gave a total of 162.5 grams. This material was further reduced with a 70/30% by weight mixture of xylol and isophorone to give 200 grams of a material containing 25% solids. This composition contained no dialkyl thiodipropionate stabilizer.

Hycar 1432 is a butadiene acrylonitrile copolymer of medium-high acrylonitrile content, polymerized at low temperature and containing ditertiary butyl paracresol antioxidant.

RP–902 is a 40% solids solution of an alkaline-condensed, heat hardenable phenol-paraformaldehyde resin dissolved in toluol and butanol.

EXAMPLE 1B

A second sample of 100 grams of the ground material, described above, was mixed with 51 grams of the Hycar 1432 solution described above, and 12.8 grams of the RP–902 phenol formaldehyde resin solution.

Dilauryl thiodipropionate was dissolved in a 70/30% (by weight) mixture of xylol/isophorone. The resulting stabilizer solution was added to the resin mixture. The added solution provided 0.9 gram of dilauryl thiodipropionate. The resulting composition was also thinned with a 70/30 mixture of xylol/isophorone to give a 25% solids solution of resin containing 2.5% of the dilauryl thiodipropionate based on the weight of resin solids.

EXAMPLE 1C

A third 100 grams quantity of the ground material was mixed with 55 grams of the Hycar 1432 solution, and 13.8 grams of the RP–902 phenol formaldehyde resin. To this was added enough stabilizer solution to provide 2.8 grams of dilauryl thiodipropionate. The mixture was diluted with a 70/30 mixture of xylol/isophorone to give a 25% solids solution. The resulting mixture contained 7.5% by weight of dilauryl thiodipropionate, based on the resin solids.

Sized 0.01 inch tin plates were primed with a phenoxy phenolic size which was applied at 5–6 milligrams per 4 square inches, and cured for 10 minutes at 400° F. A coating on the reverse side of the tin plate had been baked at 395° F. for 10 minutes, after the primer had been applied and baked. The coating compositions described in Examples 1A, 1B, and 1C were applied over the primed surface with a drawbar at 35 milligrams per 4 square inches, which gave a film thickness between 0.1 and 0.3 mil.

The coating compositions of Examples 1A, 1B, and 1C were baked for 10 minutes in a 350° F. oven. To the coating was applied 50 mils of a vinyl chloride plastisol composition which was baked 2.5 minutes at 375° F.

The test panels were cut into strips, and bent over a ¼ inch mandril. The coating composition was slit through the plastisol composition to the plate at the apex of curvature of the panel. The slit, bent panels were suspended over steam in a pressure cooker at 10 p.s.i.g., which gave a temperature of 240° F. for 5 minutes. After this time the films were inspected for lifting along the interface at the cut, and then pulled apart by hand to determine the adhesion to the substrate. The color of the various samples was compared by eye. The three examples showed improved color stability from Example 1A through Example 1C, and similarly an increase in plastisol adhesion from Example 1A through Example 1C. The coating from Example 1C was the lightest of the three panels, with the coating from Example 1B being lighter than the coating from Example 1A.

EXAMPLE 2

A thermosetting resin coating composition was made up using a short dehydrated castor oil (20%) epoxy ester resin manufactured by the Midland Division of The Dexter Corporation. It is a solution containing 45% solids, having a viscosity of $Z_1$–$Z_4$, an acid number of up to 2, a maximum color of 6, and a density of 8.00 pounds per gallon. A portion of this epoxy ester resin weighing 358 grams was mixed with 27 grams of a phenolic resin sold under the trade name of DP–139, at 50% solids and 47 grams of U–101 benzoguanamine formaldehyde resin of 60% solids and 0.5 gram of a silicone wetting agent along with appropriate solvents to make 896.5 grams total.

The DP–139 is a butylether of methylolated bisphenol-A in a solution containing 50% solids.

The U–101 is a benzoguanamine formaldehyde resin manufactured by the Midland Division of The Dexter Corporation. It is a solution containing 60% solids, has a viscostiy of D–I, an acid number of 0–3, a color of 1 and density of 8.50 pounds per gallon.

The resulting coating composition was divided into 4 samples and stabilizer was added as follows:

Sample A.—No stabilizer.
Sample B.—2.5% by weight, based on the resin solids, of dilauryl thiodipropionate.
Sample C.—5% by weight, based on the resin solids, of dilauryl thiodipropionate.
Sample D.—7.5% by weight, based on the resin solids, of dilauryl thiodipropionate.

In each case, the dilauryl thiodipropionate was mixed into the resin solution with no additional solvent.

Each of the coating compositions was drawn down over milk glass and baked 35 minutes at 375° F. The samples showed improving color as the dilauryl thiodipropionate was increased. Samples B, C, and D were very slightly softer than the control.

EXAMPLE 3

A phenolic coating composition was made up using a bisphenol A-formaldehyde resole resin manufactured and sold by the Midland Division of The Dexter Corporation as X–6484. This resin is a 50% by weight solution, having a viscosity of C–F, a color of up to 3 and a density of 8.20 pounds per gallon.

To this resin was added dimethyl thiodipropionate, di-2-ethyl hexyl thiodipropionate, dilauryl thiodipropionate, di(tridecyl) thiodipropionate and distearyl thiodipropionate at two levels, namely at 2.5% and 7.5% by weight based on the weight of the resin solids. All of the resin stabilizer mixtures were drawn down side by side by side at 0%, 2.5%, and 7.5% over white milk glass and baked for 10 minutes at 350° F. The results are set forth in Table I.

TABLE I.—DISCOLORATION

| Stabilizer | 0% addition | 2½% addition | 7½% addition |
|---|---|---|---|
| Dimethyl thiodipropionate | Normal | Lighter | Lighter. |
| Di (iso-octyl) thiodipropionate | do | do | Lightest. |
| Dilauryl thiodipropionate | do | do | Do. |
| Di (tridecyl) thiodipropionate | do | do | Do. |
| Distearyl thiodipropionate | do | do | Do.[1] |

[1] Bloom.

The di (iso-octyl) thiodipropionate, diluaryl thiodipropionate, and di (tridecyl) thiodipropionate performed comparably and were the most effective heat and color stabilizers for this resin. The dimethyl thiodipropionate was the least effective stabilizer of this group. The distearyl thiodipropionate exhibits blooming of the material to the surface of a cured film. Some difficulty was experienced in preparing the distearyl thiodipropionate in solution, but it was found that heating the solution overcame this problem.

EXAMPLE 4

Another resin combination was prepared by mixing equal parts (by weight) of RP–902 solids and Hycar 1432 to give a phenolic-butadiene-acrylonitrile blend. The RP–902 is described in Example 1, and the Hycar 1432 is described in Example 1A. This resin blend was tested with several dialkyl thiodipropionates wherein the length of the alkyl chain varied from 1 carbon to 18 carbon atoms in the manner described in Example 3. The results achieved are set forth below in Table II.

TABLE II.—COLOR DEVELOPMENT

| Stabilizer | 0% addition | 2½% addition | 7½% addition |
|---|---|---|---|
| Dimethyl thiodipropionate | Normal | Lighter | Lighter. |
| Di (iso-octyl) thiodipropionate | do | do | Lightest. |
| Dilauryl thiodipropionate | do | do | Do.[1] |
| Di (tridecyl) thiodipropionate | do | do | Do. |
| Distearyl thiodipropionate | do | do.[2] | Lighter.[2] |

[1] Slight bloom.
[2] Bloom.

As was the case in Example 3, the dimethyl thiodipropionate was the least effective of those tested; di(iso-octyl)thiodipropionate, dilauryl thiodipropionate and di (tridecyl)thiodipropionate were most effective and performed comparably; and the distearyl thiodipropionate showed a tendency to bloom.

EXAMPLE 5

In order to prove that the dialkyl thiodipropionates are useful in stabilizing a broad range of thermosetting resins, dilauryl thiodipropionate was mixed with various resins, described below, at 2.5% and 7.5% by weight based on the resin solids. A 10% solution of each resin, including each of the stabilized mixtures, was drawn down with a #20 bar, side by side by side at 0%, 2.5%, and 7.5% dilauryl thiodipropionate over milk glass and were baked for the time indicated below at 350° F. The results are set forth in Table III.

EXAMPLE 6

A one package urethane was made up of the following materials:

| | Grams |
|---|---|
| Hydroxyfunctional polyesters | 640 |
| ε-Caprolactam blocked isocyanate novolac | 88 |
| Dibutyl tin diacetate | 1.5 |

The polyester was an oil-free polyester resin made from diethylene glycol, 1–3 butylene glycol, isophthalic acid, and terephthalic acid. The polyester contained 65.0% solids, had a viscosity of T–U, an acid number of 8, a color of 2, and a density of 9.15 pounds per gallon.

The caprolactam blocked polymeric isocyanate is a commercial product sold as Isonate 123P. It is produced by a stoichiometric reaction of PAPI and ε-caprolactam. PAPI is a liquid polymeric isocyanate resulting from the phosgenation of an aniline-formaldehyde reaction product. The Isonate 123P has an NCO equivalent weight of 246 and a viscosity of 1000 cps. at 156° C.

The resins were dissolved in additional solvents. Dilauryl thiodipropionate was added at 5% by weight based on the resin solids. The stabilized mixture was drawn down side by side with a sample containing no stabilizer, and both were baked for 10 minutes at 400° F. The sample containing the dilauryl thiodipropionate showed reduced coloration.

The resins of the present invention which are stabilized in accordance with the present invention have particular application in the field of coating compositions. Within the coating compositions, the best advantage of the stabilized resins is found in the field of metal coatings, and particularly closures for packages for foods. However, the coating compositions described above may be suitably applied to glass, wood, plastic, and other substrates. Further, the thermosetting resins of the present invention may be used in applications other than coating compositions, such as casting resins and the like.

The stabilizers of the present invention may be used to stabilize single resin compositions or to stabilize combinations of two or more resins which react to form a thermosetting product. For purposes of the present invention, the term "resin system" shall include both single resin compositions and multiple resin compositions.

Auxiliary materials such as leveling agents, fillers, dyes, pigments, viscosity adjusting materials, and other conventional additives may be used in connection with the stabilized resins of the present invention. The forms of invention herein shown and described are to be considered only as illustrative. It will be apparent to those skilled in the art that numerous modifications may be made therein without departure from the spirit of the invention or the scope of the appended claims.

I claim:

1. A thermosetting resin system which comprises a thermosetting phenolic resin, said resin being stabilized against the formation of unwanted color during curing by the addition of from about 0.1 to about 12% by weight,

TABLE III

| | | Color development | | |
|---|---|---|---|---|
| Resin type | Minutes baked at 350° F. | 0% addition dilauryl thiodi-propionate | 2½% addition of DLTDP | 7½% addition of DLTDP |
| Phenol-formaldehyde | 10 | Normal | Lighter | Lightest. |
| Bisphenol A-formaldehyde | 10 | do | do | Do. |
| Condensed phenol-formaldehyde | 10 | do | do | Do. |
| Condensed bisphenol A-formaldehyde | 10 | do | do | Do. |
| 86% vinyl chloride/13% vinyl acetate-1% maleic acid modified | 30 | do | do | Do. |
| 91% vinyl chloride/3% vinyl acetate/6% vinyl alcohol | 20 | do | do | Do. |
| Polybutadiene acrylonitrile (medium high acrylonitrile) | 30 | do | do | Do. |
| Carboxyl terminated polybutadiene acrylonitrile | 20 | do | do | Do. |
| Phenol-formaldehyde blended with polybutadiene acrylonitrile (medium high acrylonitrile) | 10 | do | do | Do. | based on the weight of the resin solids, of a dialkyl thiodipropionate wherein each said alkyl group contains up to about 18 carbon atoms.

2. A stabilized thermosetting resin system, as described in claim 1, wherein the thermosetting resin is essentially free from oil.

3. A stabilized thermosetting resin system as described in claim 1, wherein the dialkyl thiodipropionate is dilauryl thiodipropionate.

4. A stabilized thermosetting resin system as described in claim 1, wherein the resin contains from about 2.5 to about 7.5% by weight, based on the weight of the resin solids, of a dialkyl thiodipropionate, wherein each said alkyl group contains from about 8 to about 18 carbon atoms.

5. A stabilized thermosetting resin system as described in claim 4, wherein the stabilizer is dilauryl thiodipropionate.

6. A coating composition which is stabilized against the formation of unwanted color during curing comprising a thermosetting phenolic resin and a dialkyl thiodipropionate, wherein each said alkyl group contains up to about 18 carbon atoms, said dialkyl thiodipropionate being present in the amount of from about 0.1 to about 12% by weight based on the weight of the resin solids.

7. A coating composition as described in claim 6, wherein the resin system is essentially free from oil.

8. A coating composition as described in claim 6, wherein the dialkyl thiodipropionate is dilauryl thiodipropionate.

9. A coating composition as described in claim 6, wherein the thermosetting resin system contains from about 2.5 to about 7.5% by weight, based on the weight of the resin solids, of a dialkyl thiodipropionate, wherein each said alkyl group contains from about 8 to about 18 carbon atoms.

References Cited
UNITED STATES PATENTS

| | | | |
|---|---|---|---|
| 3,392,157 | 7/1968 | Izumi | 260—45.85 |
| 3,641,197 | 2/1972 | Holland | 260—45.85 |
| 3,564,076 | 2/1971 | Kauder | 260—45.85 |
| 3,328,489 | 6/1967 | Murdock | 260—45.85 |

DONALD E. CZAJA, Primary Examiner

V. P. HOKE, Assistant Examiner

U.S. Cl. X.R.

161—198, 215, 261; 260—30.4 EP